April 18, 1944.   E. WILDHABER   2,346,807
METHOD OF CUTTING GEARS
Original Filed June 16, 1939   3 Sheets-Sheet 1

INVENTOR
ERNEST WILDHABER
ATTORNEY

April 18, 1944.   E. WILDHABER   2,346,807
METHOD OF CUTTING GEARS
Original Filed June 16, 1939   3 Sheets-Sheet 2

INVENTOR
ERNEST WILDHABER
ATTORNEY

April 18, 1944.  E. WILDHABER  2,346,807
METHOD OF CUTTING GEARS
Original Filed June 16, 1939   3 Sheets-Sheet 3

INVENTOR
ERNEST WILDHABER
ATTORNEY

Patented Apr. 18, 1944

2,346,807

UNITED STATES PATENT OFFICE 2,346,807

METHOD OF CUTTING GEARS

Ernest Wildhaber, Brighton, N. Y., assignor to Gleason Works, Rochester, N. Y., a corporation of New York Original application June 16, 1939, Serial No. 279,523. Divided and this application August 13, 1940, Serial No. 352,376

19 Claims. (Cl. 90—5)

The present invention relates to the manufacture of gears and particularly to the production of longitudinally curved tooth gears such as spiral bevel and hypoid gears. The present application is a division of my copending application No. 279,523, filed June 16, 1939, and is a continuation in part of my copending application, Serial No. 137,531, filed April 17, 1937, now Patent No. 2,285,133, issued June 2, 1942, and relates specifically to the rough-cutting of gears.

The invention comprises both new cutters and a new process for producing gears. The present application is directed specifically to the process.

One object of the invention is to provide a method of rough-cutting gears with which a tooth space of a gear blank may be completely rough-cut in a single pass of a gear cutting tool and in a single generating roll.

A further object of the invention is to provide a method of cutting tapered gears with which, in a single pass of a cutter and in a single generating roll, a tooth space may be cut that tapers in depth and in width from end to end.

Another object of the invention is to provide a method for rough-cutting gears with which a plurality of tooth spaces of a gear blank may be operated upon simultaneously, thus greatly increasing the speed of production and consequently reducing the cost of the rough-cutting operation.

A still further object of the invention is to provide a method for rough-cutting gears which will permit employment of two coaxially mounted cutters to operate simultaneously upon two adjacent tooth spaces of a gear blank, whereby an essential simplification in tool mechanism of the gear cutting machine and in the drive thereto may be obtained.

Still another object of the invention is to provide a method of rough-cutting longitudinally curved tooth tapered gears with which tooth spaces may be cut that are free of "bias bearing," without the necessity of employing any correcting motion between cutter and work.

Other objects of the invention will appear hereinafter from the specification and from the recital of the appended claims.

Figure 1:
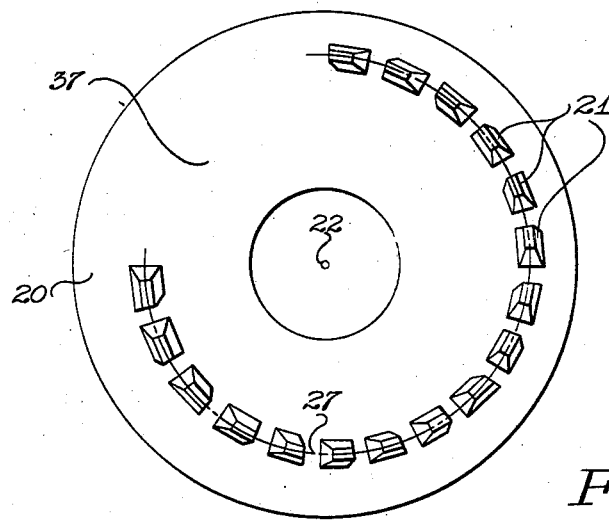
Fig. 1 is a plan view of a roughing cutter constructed according to this invention and employable in the new roughing process.

With the present invention, gears are cut in a periodic indexing process and with a generating roll. A scroll-type cutter is employed, that is, a cutter whose cutting blades project beyond one side face of the cutter in the general direction of the axis of the cutter and are arranged in a spiral at different radial distances from the axis of the cutter.

Heretofore when scroll-type cutters have been employed, the cutter and blank have been rotated together continuously in timed relation, and the continuous rotation of the work has served not only to produce the lengthwise shape of the gear teeth but to index the blank automatically. Heretofore, moreover, the scroll-type cutters used have had their blades arranged in a spiral whose lead is equal to or a multiple of the pitch of the gear to be cut.

With the method of the present invention the blank does not have continuous indexing rotation but is indexed intermittently, and the blades of the cutter are arranged in a spiral whose lead is less than the smallest normal pitch of the gear to be cut. The cutter is rotated in engagement with the blank while a relative rolling movement is produced between the cutter and blank in time with the cutter rotation. Thus different blades of the cutter will operate at different points in the generating roll. Preferably the cutter used has its blades arranged partway only around its periphery to leave a gap between the last and first blades. With this cutter, the blank may be indexed, when the gap in the cutter is abreast of the blank, without requiring that the cutter be withdrawn from engagement with the blank.

For the purpose of producing tooth spaces that taper in depth or in width, or both, from end to end, as is required on spiral bevel and hypoid gears, a cutter may be used having blades of progressively varying operating contour. The blades may vary progressively in width, or in height, or in both respects. Because the rotation of the cutter is timed to the generating roll, the different blades cut at progressively different points along the length of a tooth space during the roll. One blade will cut at the large end of the tooth space, another blade will cut at the small end of the tooth space, and between these blades there will be blades to cut at all intermediate points along the length of the tooth space.

The different blades may be arranged either in a plane spiral or in a three-dimensional spiral. That is, the blades may be so made that their opposite sides intersect in points, which lie in a plane perpendicular to the axis of the cutter, or in points, which are displaced from one another axially of the cutter. When a cutter of the latter type is employed it is possible to rough-cut spiral bevel and hypoid gears without "bias bearing," but nevertheless without requiring any correcting motion.

The scroll form of cutter is preferably not used alone but in combination with another scroll cutter or in combination with a standard face-mill gear cutter. Thereby, cutting may be effected simultaneously in a plurality of tooth spaces of the gear blank.

Where a scroll cutter is employed in combination with other scroll cutters, the several cutters will differ in lead so as to permit of rough-cutting simultaneously a plurality of tooth spaces with the proper taper in width. Moreover, the different cutters will be made with blades of different heights so that the different cutters will cut successively deeper into a tooth space of the blank, when the blank is indexed. Thus, the work of roughing out the tooth slots of the blank will be distributed equally among the several cutters.

Where a scroll cutter is employed in combination with a standard face-mill gear cutter, the standard cutter may be either the outside cutter or the inside cutter, depending upon the direction of indexing rotation of the work. It is desirable to have the standard cutter arranged so it can take the initial cut in the blank, and to employ the scroll cutter simply to deepen the slot previously cut out by the standard cutter and to apply the final roughing cut. The standard cutter may be driven at a different rate of speed from the scroll cutter. The scroll cutter makes preferably only one revolution in the cutting of a tooth space of the blank, and the indexing of the blank may be effected by extending the roll so that the blank will roll clear of the cutters, or by effecting a slight relative withdrawal movement between the cutters and blank, when the scroll cutter is abreast of the blank, and then indexing the blank.

To cut tooth spaces of tapering width from end to end it has heretofore been proposed to use two eccentrically mounted face-mill gear cutters. Either of the last two described embodiments of the invention has the advantage over two eccentrically mounted face-mill cutters that the two cutters may be mounted coaxially. This simplifies the construction of the gear cutting machine and especially of the cutter drive.

The cutters employed in the present invention may have either straight side-cutting edges or cutting edges of curved profile, and, if a profile curvature is used, this may be of any suitable character.

Reference will now be had to the drawings for a more detailed description of the invention.

Figure 2:
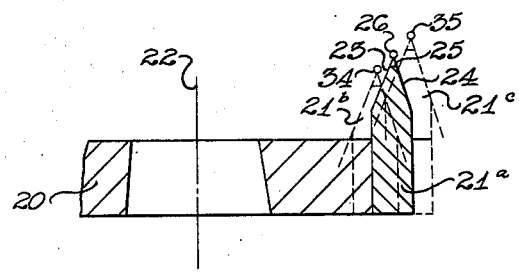
Fig. 2 is a fragmentary sectional view and Fig. 4 is a developed view further illustrating one specific embodiment of such a cutter.

In Figs. 1 and 2, a cutter 20 is shown that has a plurality of cutting blades 21. These blades project beyond one side face of the cutter in the general direction of the axis 22 of the cutter and are arranged in a spiral about the axis 22 of the cutter. The opposite side-cutting edges of the blades are straight and of positive pressure angle, as indicated by the blade 21a shown in section in Fig. 2. The opposite sides of this blade are denoted as 23 and 24, respectively, and its tip cutting edge is denoted at 25. When prolonged, the opposite sides of the blade intersect in a point, such as the point 26 and form an inverted V.

To cut, as desired, the tooth spaces of a tapered gear, successive blades of the cutter are made of varying width or height or both, so that as they cut successively along the length of a tooth space of a gear blank, they will produce the desired variation in width or depth, or both, of the tooth space.

Since the blades 21 of the cutter 20 are arranged in a spiral, the points of convergence of the opposite sides of these blades lie also in a spiral, as indicated at 27 in Fig. 1. The spiral 27 may be a plane spiral, located in a plane perpendicular to the axis 22 of the cutter, or it may be a spiral in space. The two different forms of cutter are illustrated diagrammatically in Figs. 3 and 4.

Figure 3:
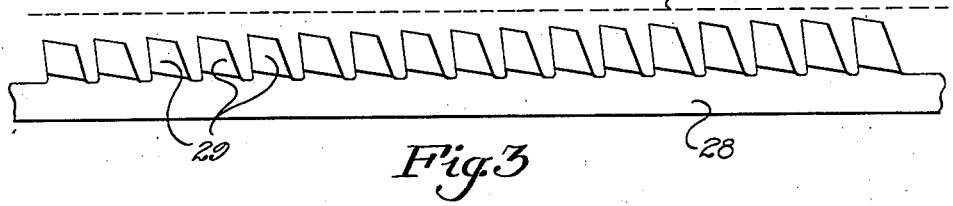
Fig. 3 is a developed view illustrating another specific embodiment of such a cutter.

Fig. 3 shows the development of a scroll cutter 28 having a plurality of cutting blades 29 which are of progressively increasing height. The opposite side-cutting edges of the blades of this cutter converge in points which lie in a plane spiral which, in the developed view, is denoted by the straight line 30.

Figure 4:
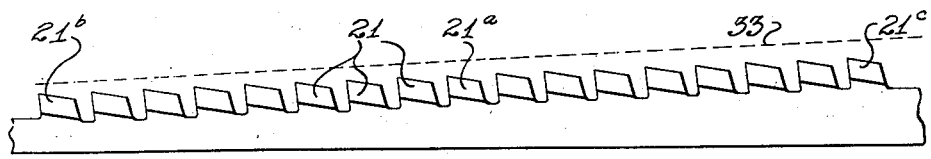

Fig. 4 shows a scroll-type cutter having a plurality of cutting blades 21 which are also of progressively varying height but whose opposite side-cutting edges converge in points that lie in a spiral in space, that is, in a spiral which is displaced axially as well as radially of the cutter axis. This spiral is indicated by the dotted line 33 in the developed view of Fig. 4.

The arrangement shown in Fig. 4 is further illustrated in Fig. 2. This figure shows one blade 21a of the cutter in section and two other blades 21b and 21c in dotted lines. The blade 21b may cut at the large end of a tooth space of a gear blank, the blade 21a midway the length of the tooth space, and the blade 21c at the small end of the tooth space. The opposite sides of these blades converge in the points 34, 26 and 35, respectively. These points have not only different radial distances from the axis 22 of the cutter but also different positions axially of the cutter.

A cutter, such as shown in Figs. 2 and 4, has the advantage that it may be used to rough-cut gears free of "bias-bearing." In my United States Patent No. 1,980,365 I have disclosed a method for simultaneously cutting two sides of the teeth of a spiral bevel or hypoid gear without "bias bearing." This method consists in providing an axial motion, during the generating roll, about the axis of the crown gear or other basic gear to which the gear being cut is generated conjugate. When a cutter such as illustrated in Figs. 2 and 4 is employed, it is possible to eliminate this additional motion and still avoid a "bias bearing," for, when such a cutter is turned on its axis, it is as though a scroll cutter were being turned on its axis and simultaneously moved along that axis.

In operation, as already indicated, the cutter is rotated in engagement with the blank while a relative rolling movement is produced between the cutter and blank in time with the cutter rotation. During this rolling movement, therefore, the different blades of the cutter cut at progressively different points along the length of a tooth space of the blank, producing the desired taper of the tooth space. When the gap 37 in the cutter is abreast of the blank, the rolling movement is reversed and the blank indexed. At the end of the return roll, the roll is again reversed and the cutter begins to rough-generate a new tooth space of the blank.

Preferably, the scroll-type cutter, such as shown in Figs. 1 to 4, inclusive, is not used alone but in combination with other scroll-type cutters or in combination with standard face-mill gear cutters.

Figure 5:
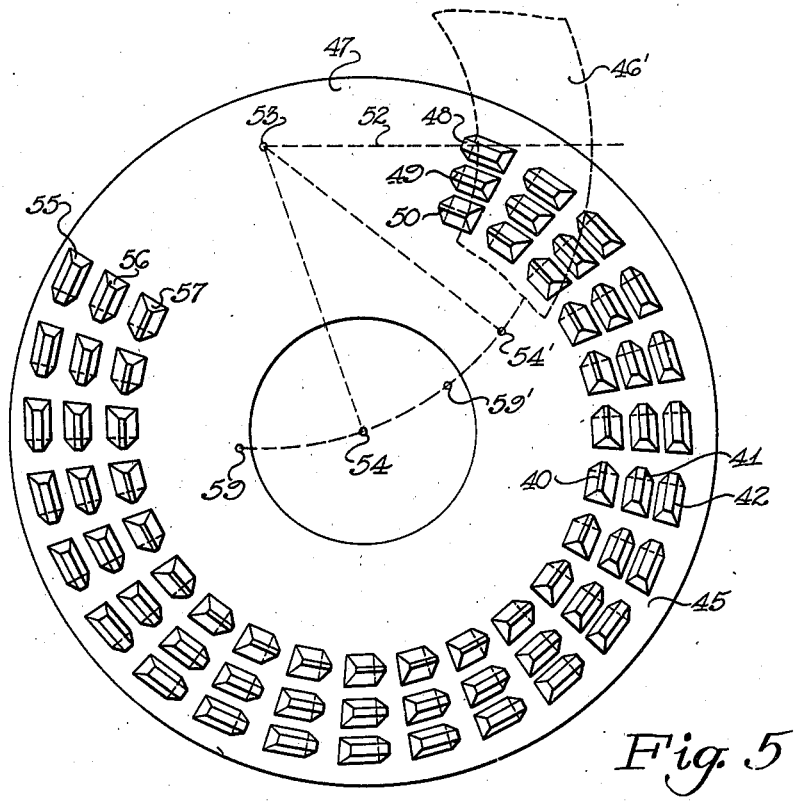
Fig. 5 is a plan view showing a roughing cutter constructed according to another embodiment of this invention and illustrating the relationship of the blank and cutter during the rough-cutting operation.
Figure 6:
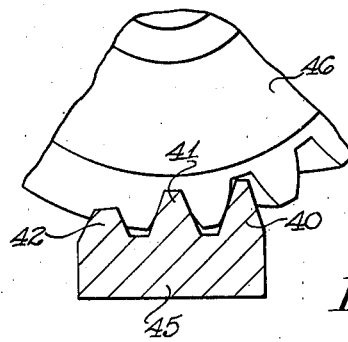
Fig. 6 is a fragmentary sectional view of a gear blank and the cutter shown in Fig. 5, further illustrating their cutting relationship.

Figs. 5 and 6 show a scroll cutter used in combination with other scroll cutters. Here three cutters are shown used in combination as indicated by the three rows 40, 41 and 42 of cutting teeth. In the embodiment shown, the three rows of blades are made integral with a common head 45 so that in effect they constitute a single cutter having a plurality of cutting blades arranged part-way around its periphery in two spirals denoted at 42 and 41 and in a circle or spiral 40, respectively. The three rows of blades are adapted to cut, respectively, in different tooth spaces of a gear blank as shown in Fig. 6.

While the heights of the successive teeth of each row of blades vary around each row, the corresponding cutting teeth of the different rows of blades are also preferably made different in height from one another, as shown in Fig. 6. The gear blank 46, which is to be cut, is indexed in such direction that the row of blades 42, which are of the smallest height, cut into the solid blank. The second row of blades 41 cuts further into a tooth space which has previously been roughed out by the row 42, and the inmost row of blades 40 applies the final roughing cut in a tooth space through which the two other rows of blades 41 and 42 have previously passed. This means that, as viewed in Fig. 6, the blank is indexed in a counterclockwise direction. Preferably, the blades in the inmost row 40 are arranged so that the points of convergence of their opposite sides will lie in a circle or a helix circumscribed about the axis of the cutter.

In cutting a gear with the cutter 45, the cutter is rotated in engagement with the gear blank while the relative rolling movement in time with the cutter rotation is produced between the cutter and blank, and the blank is indexed through one tooth space when the gap 47 of the cutter is abreast of the blank. The first cutting blades 48, 49 and 50 of the cutter are adapted to cut at the large end of the tooth spaces of the blank. By varying the pressure angle of the blades in the several rows, it is possible to have the roughing rows 42 and 41 cut the desired spiral angle and pressure angle upon the gear. Thus, as shown in Fig. 6, the blades of the row 42 are provided with sides of larger pressure angle than the sides of the blades of the row 41 and, in turn, the blades of row 41 are provided with blades whose pressure angles are greater than the pressure angles of the sides of the blades 40.

It is believed unnecessary to show the computation of the shape of the threads 41 and 42 in detail because this can be determined experimentally without difficulty. A pinion, like the one to be cut, may be gashed and used as a cutting tool for forming the required thread shape in a lead blank. This is done by rotating the lead blank in engagement with the pinion tool while producing a relative rolling movement between the lead blank and the pinion tool exactly the same as if the cutter represented by the lead blank were rotating and rolling with the pinion to be cut. This experimental determination of the cutter shape is also applicable to other embodiments of the invention.

In Fig. 5, the pinion to be cut is shown in development and denoted at 46'. Its axis is at 52 and its apex at 53. The cutter 45 is shown at the start of the roll. During the roll, the cutter is swung relative to the blank about the apex or axis 53 of the basic generating gear so that the cutter axis moves from the position 54 to the position 54'. In the position 54', cutting blade 57 will have just finished cutting the small end of a tooth space of the gear blank. Then follows a quick return roll to position 54 and indexing of the blank through one tooth space, while the gap 47 of the cutter is abreast of the blank.

Since all three rows of blades cut into the solid blank on the first generating roll, it is desirable to remove a reduced amount of stock during this roll, thereby to reduce the burden upon the tool. For this reason, it is desirable to make the first roll a special roll. Thus, the cutter may be rolled from the position 59 to the position 59' during the first roll. This leaves an extra amount of stock in the first three tooth spaces of the gear blank which have to be removed. Hence, the blank must be indexed one more time than it has tooth spaces, in order to permit recutting the first tooth space to the desired depth. The total number of rolls therefore will equal the number of tooth spaces in the blank plus one. In other words, the blank is completely roughed out after the cutter has made $n+1$ revolutions, where $n$ is the number of tooth spaces in the blank.

The wide points of the cutting teeth of the cutter shown in Figs. 5 and 6 make for longer cutter life. Even the point width of the blades of the row 40, which performs the final cut and forms the whole tooth side, is generally wider than the point width used in prior cutting methods, except for those blades which cut at the small end of the tooth space of the blank, and those blades are equal in point width to the point width of the blades of cutters of previous construction.

Figure 7:
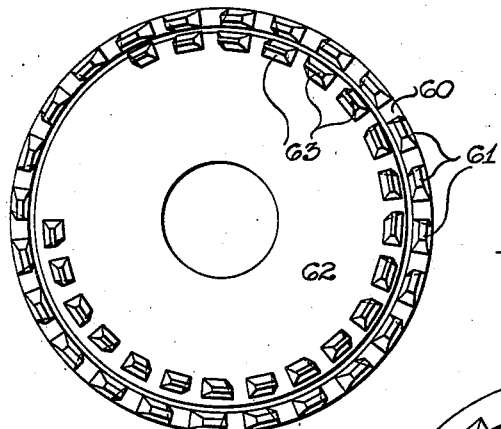
Fig. 7 is a plan view and Fig. 8 is a transverse section, showing how a scroll-type cutter made according to this invention may be combined with a standard face-mill gear cutter for the purpose of rough-cutting gears according to this invention.
Figure 9:
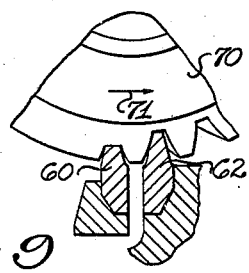
Fig. 9 is a fragmentary view illustrating the method of operation of the cutters shown in Figs. 7 and 8.
Figure 8:
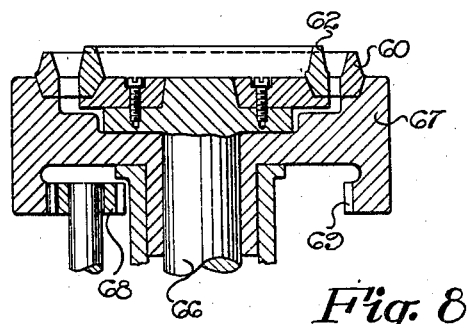

A further embodiment of the invention is illustrated in Figs. 7 to 9, inclusive. Here a cutter of spiral form constructed according to the present invention is combined with an ordinary face-mill gear cutter for the purpose of the rough-cutting. The standard face-mill gear cutter is denoted at 60. It has a plurality of cutting blades 61 arranged annularly around its periphery and projecting beyond one side face in the general direction of its axis. The spiral cutter is denoted at 62. It has a plurality of cutting blades 63 arranged in a spiral about its axis. The blades of the standard cutter 60 are of uniform height according to standard practice. The blades of the cutter 62 vary in height or in width, or both.

The two cutters 60 and 62 are mounted coaxially of one another but are preferably driven independently of one another. The cutter 62 may be secured to a spindle 66 and the cutter 60 to a plate 67 which is journaled coaxially of the spindle 66. The plate 67 may be driven through a pinion 68 and an internal gear 69, while the spindle 66 may be driven from any other suitable source of power.

The blades 61 of the cutter 60 are preferably made of reduced height and consequently of wide point width. The blank 70 (Fig. 9) to be cut is indexed in the direction indicated by the arrow 71 so that the cut into the solid is made, except in the first roll, exclusively by the cutting blades or teeth of the standard cutter 60. The scroll cutter 62 produces the desired final tooth depth and tooth taper.

The standard cutter 60 is rotated at a convenient cutting speed. It may turn three or four times per revolution of the scroll cutter 62. The scroll cutter makes only one revolution per cycle or per complete generating roll. Preferably, the roll is started in the position where the standard cutter 60 clears the blank entirely and the indexing of the blank takes place in the same position.

Figure 10:
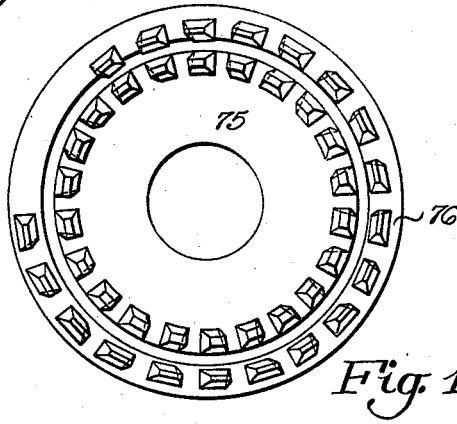
Fig. 10 is a plan view showing a different combination of face-mill and scroll cutters.

Fig. 10 illustrates a modification of the embodiment shown in Figs. 7 to 9, inclusive. Here the standard face-mill cutter, which is denoted at 75, is mounted inside of the scroll cutter, which is denoted at 76. Otherwise, the basic construction of the two cutters is the same as described with reference to the embodiment shown in Figs. 7 to 9, inclusive. The standard cutter has blades of uniform height while the scroll cutter has blades of progressively varying operating contour.

While the invention has been described in connection with the use of tools which have straight side-cutting edges, it will be understood that the invention is applicable also where tools are used having curved side-cutting edges. Thus the blades of a cutter may have outside and inside cutting edges which are both concave, or the outside cutting edge may be of straight profile and the inside cutting edge of concave shape, or the outside cutting edge may be convex and the inside cutting edge concave, etc., as described in more detail in my parent application above mentioned.

The blades of the cutters may be sharpened so that each blade has opposite side-cutting edges, or alternate blades may be sharpened to have oppositely disposed side-cutting edges, or any other suitable method of sharpening may be employed. If alternate blades have oppositely disposed cutting edges, the inverted V in which the opposite side-cutting edges lie, is understood to be the V formed by the axial profile of the surfaces in which the outside and inside cutting edges lie, that is to say, the axial profile of the cutting surfaces.

While the invention has been described in connection with a number of different embodiments thereof, it will be understood that it is capable of still further modification. This application is intended to cover any variations, uses, or adaptations of the invention following, in general, the principles of the invention and including such departures from the present disclosure as come within known or customary practice in the gear art and as may be applied to the essential features hereinbefore set forth and as fall within the scope of the invention or the limits of the appended claims.

Having thus described my invention, what I claim is:

1. The method of cutting a gear which comprises employing a rotary cutter, that has a plurality of cutting blades projecting beyond one side face in the general direction of its axis and arranged part-way around its periphery in a spiral whose lead is less than the pitch of the gear to be cut and with a gap between the last and first blades, and rotating said cutter in engagement with a gear blank while producing a relative rolling movement between the cutter and blank in time with the cutter rotation so that different blades of the cutter cut at different points along the length of a tooth space of the gear blank during the rolling movement, and indexing the blank when the gap in the cutter is abreast of the blank.

2. The method of cutting a gear which comprises employing a rotary cutter, that has a plurality of cutting blades of progressively varying height projecting beyond one of its side faces and extending in the general direction of its axis and arranged part-way around its periphery in a spiral whose lead is less than the pitch of the gear to be cut, with a gap between the last and first blades, and rotating said cutter in engagement with a gear blank while producing a relative rolling motion between the cutter and blank in time with the cutter rotation so that different blades of the cutter cut at different points along the length of a tooth space of the blank from one end thereof to the other in a revolution of the cutter, and indexing the blank when the gap in the cutter is abreast of the blank.

3. The method of producing a tapered gear which comprises employing a rotary tool, which has an operating portion projecting beyond one side face in the general direction of the axis of the tool, which is of progressively varying height and whose opposite sides converge in points that lie on a three-dimensional spiral coaxial with the tool, and cutting each tooth space of the blank by rotating said tool in engagement with the work while producing a relative rolling movement between the tool and work in time with the tool rotation so that different blades of the cutter cut at different points along the length of the tooth space from one end thereof to the other during the rolling movement, and indexing the blank periodically.

4. The method of cutting a tapered gear which comprises employing a rotary cutter, that has a plurality of cutting blades of progressively varying height projecting beyond one side face in the general direction of the axis of the tool and arranged part-way around its periphery with a gap between the last and first blades, whose opposite side-cutting edges converge in points which lie in a three-dimensional spiral coaxial with the cutter, rotating said cutter in engagement with a tapered gear blank while producing a relative rolling movement between the cutter and blank in time with the cutter rotation so that different blades of the cutter cut at different points along the length of a tooth space of the blank from one end thereof to the other during a revolution of the cutter and indexing the blank when the gap in the cutter is abreast of the blank.

5. The method of cutting a gear which comprises employing a pair of cutters which have their cutting blades projecting beyond one side face in the general direction of said axis, one of said cutters having its cutting blades spaced at a constant radial distance from its axis and the other of said cutters having its cutting blades spaced at varying radial distances from its axis, mounting said cutters so that they are coaxial and will cut simultaneously in two different tooth spaces of the blank, rotating the cutters together about their common axis in engagement with the blank, and indexing the blank periodically.

6. The method of cutting tapered gears which comprises employing cutting apparatus that has a plurality of rows of cutting blades arranged about a common axis and adapted to operate, respectively, in different tooth spaces of the blank, one of the rows of blades being of less height than the other rows, rotating the apparatus in engagement with the blank while producing a relative rolling movement between the apparatus and the blank, and indexing the blank from tooth space to tooth space in such a direction that the row of blades which is of smaller height cuts first into the blank.

7. The method of cutting a gear which comprises employing a pair of rotary cutters which have a common axis of rotation and each of which has a plurality of side-cutting blades projecting beyond one side face in the direction of its axis, one of the cutters having its cutting blades spaced at a constant radial distance from its axis and the other of said cutters having its cutting blades arranged in a spiral whose lead is less than the smallest normal pitch of the gear to be cut, the blades of one of said cutters being shorter than the blades of the other, engaging said cutters with a gear blank so that they operate simultaneously in two different tooth spaces of the blank, rotating said cutters in engagement with the blank, and indexing the blank periodically through the distance of a single tooth space so that the cutter with the higher blades deepens the cut taken by the cutter with the shorter blades.

8. The method of cutting a gear which comprises employing a rotary cutter that has a plurality of cutting blades projecting beyond one side face in the general direction of its axis and which are arranged part-way only around its periphery in a plurality of spirals which have different leads, the lead of each spiral being less than the pitch of the gear to be cut and the blades of one spiral being smaller in height than the blades of the next adjacent, positioning said cutter so that the blades of the different spirals operate simultaneously in different tooth spaces of a gear blank, rotating the cutter on its axis in engagement with the blank while producing a relative rolling movement between the cutter and blank in time with the cutter rotation and indexing the blank when the gap in the cutter is abreast of the blank.

9. The method of cutting a gear which comprises employing a rotary cutter that has a plurality of side-cutting blades which project beyond one side face in the general direction of the axis of the cutter and are arranged in a definite spiral whose lead is less than the pitch of the gear to be cut, rotating said cutter in engagement with a gear blank, while producing a relative rolling movement between the cutter and blank in time with the cutter rotation so that successive blades of the cutter cut at successively different points in the generating roll and indexing the blank periodically.

10. The method of producing a tapered gear which comprises employing a rotary tool that has an operating portion of progressively varying operating contour projecting beyond one of its side faces and extending in the general direction of its axis and arranged in a spiral whose lead is less than the pitch of the gear to be cut, and cutting each tooth space of the blank by rotating said tool in engagement with a gear blank while producing a relative rolling movement between the tool and blank in time with the tool rotation so that different blades of the cutter cut at different points along the length of the tooth space from one end thereof to the other during the rolling movement, and indexing the blank periodically.

11. The method of cutting a gear which comprises employing a rotary cutter, that has a plurality of cutting blades of progressively varying point width projecting beyond one side face and extending in the general direction of its axis and arranged in a spiral whose lead is less than the pitch of the gear to be cut, and rotating said cutter in engagement with a gear blank while producing a relative rolling motion between the cutter and blank in time with the cutter rotation so that different blades of the cutter cut at different points along the length of a tooth space of the blank during the rolling movement, and indexing the blank periodically.

12. The method of cutting a gear which comprises employing a rotary cutter, that has a plurality of cutting blades of progressively varying height and progressively varying point-width projecting beyond one side face and extending in the general direction of its axis and arranged in a spiral whose lead is less than the pitch of the gear to be cut, and rotating said cutter in engagement with a gear blank while producing a relative rolling motion between the cutter and blank in time with the cutter rotation so that different blades of the cutter cut at different points along the length of a tooth space of the blank during the generating movement, and indexing the blank periodically.

13. The method of cutting a gear which comprises employing a cutter that has a plurality of cutting blades projecting beyond one side face in the general direction of its axis and which are arranged in a plurality of spirals which have different leads, the lead of each spiral being less than the pitch of the gear to be cut, and the blades of one spiral being smaller in height and of larger pressure angle than the blades of the next adjacent spiral, positioning said cutter so that the blades of the different spirals operate simultaneously in different tooth spaces of the gear blank, rotating the cutter in engagement with the blank while producing a relative rolling movement between the cutter and blank in time with the cutter rotation, and indexing the blank periodically in such direction that the blades of the spiral which is of smaller height cut first into the blank.

14. The method of cutting a tapered gear which comprises employing cutting apparatus that has a plurality of rows of cutting blades arranged about a common axis and extending in the general direction of said axis and adapted to operate, respectively, in different tooth spaces of the blank, the blades of one of the rows being spaced at a constant radial distance from the axis and being of constant height, and the blades of another row being arranged about the axis in a spiral whose lead is less than the smallest normal pitch of the gear to be cut and being of progressively varying height, the blades of the latter row being all of greater height than the blades of the first-named row, rotating said cutting apparatus in engagement with a tapered gear blank while producing a relative rolling movement between the cutting apparatus and the blank in time with the rotation of the spirally arranged row of blades, and indexing the blank periodically through the distance of a single tooth space in such direction that the first-named row of blades cuts first into the solid blank.

15. The method of cutting a tapered gear which comprises employing a pair of rotary cutters which have a common axis of rotation and each of which has a plurality of side-cutting blades projecting beyond one side face in the direction of its axis, one of the cutters having its cutting blades arranged at a constant radial distance from the axis, and the other of said cutters having its cutting blades arranged in a spiral whose lead is less than the smallest normal pitch of the gear to be cut, the blades of one of said cutters being shorter and of greater pressure angle than the blades of the other cutter, engaging said cutters with a tapered gear blank so that they operate simultaneously in two different tooth spaces of the blank, rotating said cutters in engagement with the blank, and indexing the blank periodically through the distance of a single tooth space in such direction that the cutter with the blades of smaller height cuts into the solid blank first.

16. The method of cutting a tapered gear which comprises employing a pair of cutters which have a common axis of rotation and which have their cutting blades projecting beyond one side face in the general direction of said axis, one of said cutters having its cutting blades disposed at a constant radial distance from the axis, and the other of said cutters having its cutting blades arranged about said axis in a spiral whose lead is less than the smallest normal pitch of the gear to be cut, positioning said cutters in engagement with a tapered gear blank so that they will cut simultaneously in two different tooth spaces of the blank, and rotating said cutters in engagement with the blank, while producing a relative rolling motion between the cutters and blank, said rolling motion being timed to the rotation of the cutter which has spirally arranged blades, and indexing the blank periodically.

17. The method of cutting a tapered gear which comprises employing a cutting apparatus having a plurality of blades arranged about a common axis in a plurality of rows which have different leads, each of said blades projecting beyond one side face of the cutting apparatus in the general direction of said common axis, and the blades of one row being of less height than the blades of the next row, positioning said cutting apparatus in engagement with a tapered gear blank so that the different rows of blades will cut, respectively, in different tooth spaces of the blank, and rotating said cutting apparatus in engagement with the blank, and indexing the blank periodically in such a direction that the row of blades, which are of smallest height, will cut into the blank first.

18. The method of cutting a tapered gear which comprises employing a cutting apparatus which has a plurality of cutting blades arranged about a common axis in a plurality of rows which have different leads, each of the blades projecting beyond one side face of the cutting apparatus in the general direction of said common axis, the blades of one of said rows being arranged in a spiral of positive lead whose lead is less than the smallest normal pitch of the gear to be cut, positioning said cutting apparatus with reference to a tapered gear blank so that the different rows of blades will cut, respectively, in different tooth spaces of the blank, and rotating said cutting apparatus on said common axis in engagement with the blank, and periodically indexing the blank.

19. The method of cutting a tapered gear which comprises employing a cutting apparatus which has a plurality of cutting blades arranged about a common axis in a plurality of rows which have different leads, each of said blades projecting beyond one side face of the cutting apparatus in the general direction of said common axis, one of said rows having its blades arranged in a spiral of positive lead whose lead is less than the smallest normal pitch of the gear to be cut, and the blades in said spirally arranged row being of progressively varying operating contour, positioning said cutting apparatus with reference to a tapered gear blank so that the different rows of blades will operate, respectively, in different tooth spaces of the blank, and rotating said cutting apparatus in engagement with the blank while producing a relative rolling motion between the cutting apparatus and blank in time with the rotation of said spirally arranged row of blades, and indexing the blank periodically.

ERNEST WILDHABER.